United States Patent
Kim et al.

(10) Patent No.: US 7,193,011 B2
(45) Date of Patent: Mar. 20, 2007

(54) METHOD OF PREPARING WATER-DISPERSIBLE POLY (URETHANE-UREA) HAVING AROMATIC-ALIPHATIC ISOCYANATE

(75) Inventors: Jung Hyun Kim, Seoul (KR); In Woo Cheong, Gyeonggi-do (KR); Kyoung Min Ahn, Seoul (KR)

(73) Assignee: Yonsei University, Seoul (KR)

( * ) Notice: Subject to any disclaimer, the term of this patent is extended or adjusted under 35 U.S.C. 154(b) by 283 days.

(21) Appl. No.: 10/874,327

(22) Filed: Jun. 24, 2004

(65) Prior Publication Data

US 2005/0009984 A1  Jan. 13, 2005

(30) Foreign Application Priority Data

Jul. 10, 2003  (KR) ............... 10-2003-0046930

(51) Int. Cl.
*C08J 3/00* (2006.01)
*C08K 3/20* (2006.01)
*C08L 75/00* (2006.01)
*C08G 18/00* (2006.01)
*C08G 18/10* (2006.01)

(52) U.S. Cl. ............ 524/591; 524/589; 524/590; 524/839; 524/840; 528/44; 528/59; 528/61; 528/65; 528/67; 528/68; 528/71; 528/80; 528/81; 528/84; 528/85

(58) Field of Classification Search ........ 524/589, 524/590, 591, 839, 840; 528/44, 59, 61, 528/65, 67, 68, 71, 80, 81, 84, 85

See application file for complete search history.

(56) References Cited

U.S. PATENT DOCUMENTS 5,354,807 A * 10/1994 Dochniak ............ 524/591

FOREIGN PATENT DOCUMENTS

| JP | 45-10957 | 4/1970 |
|----|----------|--------|
| JP | 39-5989 | 4/1989 |
| JP | 04-328187 | 11/1992 |
| JP | 05-043642 | 2/1993 |

* cited by examiner

*Primary Examiner*—Patrick D. Niland
(74) *Attorney, Agent, or Firm*—Finnegan, Henderson, Farabow, Garrett & Dunner LLP

(57) ABSTRACT

The present invention relates to a method of preparing water-dispersible poly (urethane-urea) having aliphatic-aromatic isocyanate, more particularly to a method of preparing water-dispersible poly (urethane-urea) having aliphatic-aromatic isocyanate, with improved mechanical/thermal properties, such as heat resistance, chemical resistance and adhesion, good cost competitiveness and environmental friendliness, by reacting polyester polyol, dimethylol propionic acid and an aromatic isocyanate compound to obtain a hydroxyl (OH)-terminated prepolymer, adding an aliphatic isocyanate compound to said OH-terminated prepolymer to obtain an isocyanate (NCO)-terminated prepolymer wherein aromatic-aliphatic isocyanate is hybridized, neutralizing, water-dispersing and chain extending said NCO-terminated prepolymer.

9 Claims, 3 Drawing Sheets

METHOD OF PREPARING WATER-DISPERSIBLE POLY (URETHANE-UREA) HAVING AROMATIC-ALIPHATIC ISOCYANATE

BACKGROUND OF THE INVENTION

1. Field of the Invention

The present invention relates to a method of preparing water-dispersible poly (urethane-urea) having aliphatic-aromatic isocyanate, more particularly to a method of preparing water-dispersible poly (urethane-urea) having aliphatic-aromatic isocyanate, with improved mechanical/thermal properties, such as heat resistance, chemical resistance and adhesion, good cost competitiveness and environmental friendliness, by reacting polyester polyol, dimethylol propionic acid and an aromatic isocyanate compound to obtain a hydroxyl (OH)-terminated prepolymer; adding an aliphatic isocyanate compound to the OH-terminated prepolymer to obtain an isocyanate (NCO)-terminated prepolymer wherein aromatic-aliphatic isocyanate is hybridized; neutralizing; water-dispersing and chain-extending the NCO-terminated prepolymer.

2. Description of the Related Art

Polyurethane is prepared into a variety of products, including hard foam, soft foam, film, soft/hard elastomer and fiber. Until the 1980s, the Korean polyurethane industry has developed focusing on daily goods materials such as clothes, shoes, bags, toys, sofas and beds. Currently, it has expanded its market to heavy industry materials for automobiles, electronics, civil engineering and shipbuilding.

Most of the conventional polyurethane products were organic solvent-based ones. However, with the rise of environmental recognition, demand on water-dispersible polyurethane is slowly increasing in the western world.

Efforts have been made to obtain water-dispersible polyurethane. Of them is a method of dispersing self-emulsifying resin, prepared by introducing hydrophilic groups to the polyurethane backbone, in water [Japanese Patent Publication Nos. Hei 4-328187 and Hei 5-43642], and a method of dispersing hydrophobic polyurethane by mechanical force using external emulsifying agents [Japan Patent Publication Nos. Sho 39-5989 and Sho 45-10957].

In the conventional preparation method of water-dispersible poly (urethane-urea), low-molecular-weight prepolymer with low viscosity having ionic groups is dispersed in water and a polymer dispersion solution is obtained from it using a chain extender, as follows.

Polyol and catalyst (if necessary) are sufficiently stirred at 80 to 100° C., and isocyanate is added. Reaction is carried out until the NCO group content of the isocyanate reaches the theoretical value. After adding dimethylol propionic acid and diols, reaction is carried out until the theoretical value is attained. Then, such solvent as acetone and methyl ethyl ketone is added to adjust viscosity. When an aliphatic isocyanate has been used, the NCO-terminated prepolymer is dispersed in water to form stable particles and the chain extension is carried out for 3 to 4 hours by adding an amine based chain extender. When an aromatic isocyanate has been used, coagulation or gelation may occur during the dispersion due to the side reaction of NCO group with water molecules. Therefore, the NCO groups should be consumed by using a diol or diamine based chain extender before the dispersion. For both cases, solvent remaining in the resultant dispersing solution can be removed by a vacuum rotary evaporator.

For an aliphatic isocyanate, a polyurethane resin with large molecular weight can be prepared by aqueous dispersion of the low-molecular-weight polyurethane prepolymer and followed by the chain extension. However, for an aromatic isocyanate, preparation of a polyurethane resin with large molecular weight is impossible, because chain extension is carried out in bulk prior to water-dispersing to prevent side reaction with water molecules.

SUMMARY OF THE INVENTION

The present inventors made efforts to solve the problems of the conventional prepolymer mixing process for the water-dispersible poly (urethane-urea) preparation. In doing so, they found that water-dispersible poly (urethane-urea) with improved mechanical/thermal properties, such as heat resistance, chemical resistance, adhesion, and good cost competitiveness can be obtained by forming isocyanate hybrid prepolymer from addition of an aromatic compound, which has not been used so far due to the high reactivity with water, to an aliphatic isocyanate compound, and neutralizing, dispersion, and chain extension.

Thus, it is an object of the present invention to provide a more effective preparation method of water-dispersible poly (urethane-urea) having stable properties.

DETAILED DESCRIPTION OF THE PREFERRED EMBODIMENTS

Figure 1:
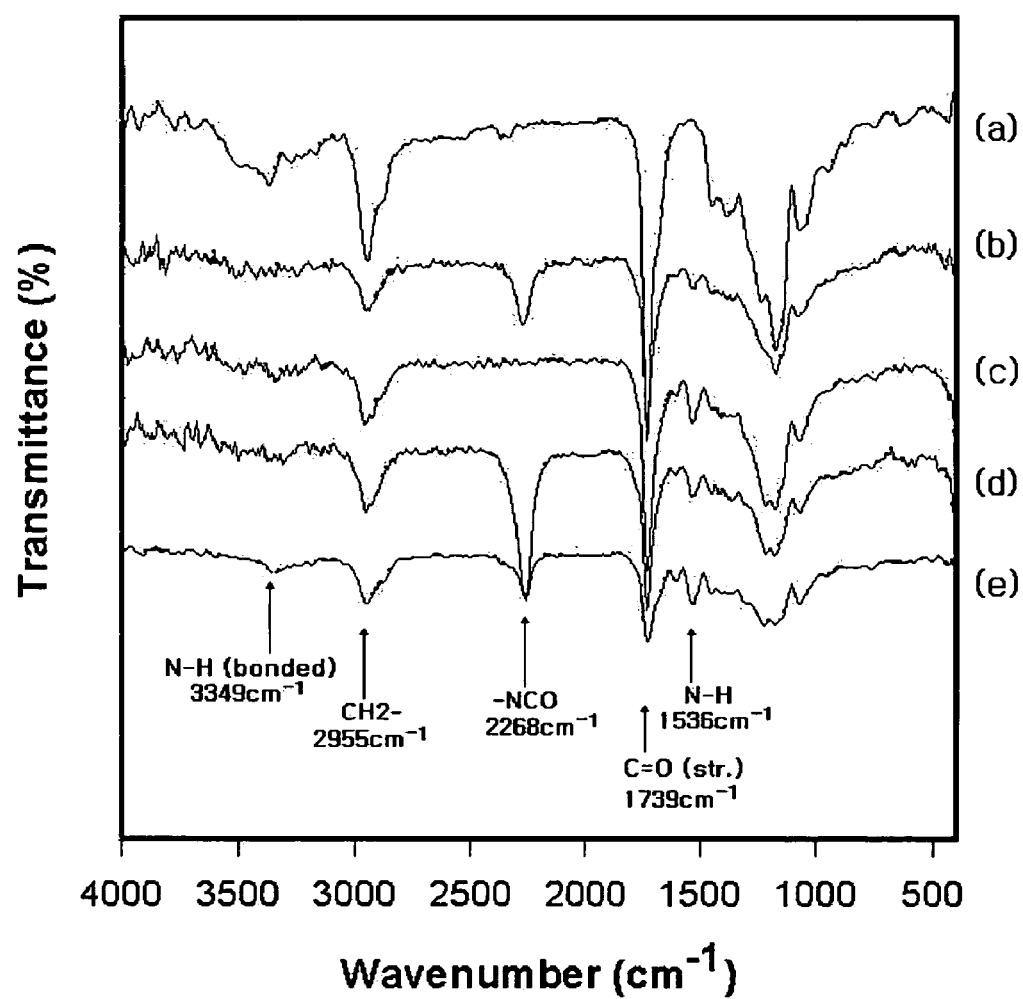
FIG. 1 is the FT-IR analysis result showing the change of NCO group content during the reaction of Example 1,
(a) after mixing polyol and DMPA;
(b) just after adding aromatic isocyanate after mixing of polyol and DMPA;
(c) after PU prepolymer with OH groups at both ends has been prepared;
(d) just after adding aliphatic isocyanate to PU prepolymer with OH groups at both ends; and
(e) after aromatic-aliphatic hybrid isocyanate PU prepolymer with NCO groups at both ends has been prepared (prior to chain extension).

The present invention is characterized by a method of preparing water-dispersible poly (urethane-urea) having aliphatic-aromatic isocyanate comprising the steps of:

a) reacting polyester polyol comprising at least 30 wt % of crystalline polyol having a melting point of higher than 30° C. and dimethylol propionic acid (DMPA) at 50 to 60° C. at 90 to 120 rpm/min, and further reacting for 20 to 40 minutes after adding an aromatic isocyanate compound to prepare a hydroxyl (OH)-terminated prepolymer;

b) heating the hydroxyl-terminated prepolymer to 70 to 80° C. and adding excess aliphatic isocyanate compound to prepare an isocyanate (NCO)-terminated prepolymer;

c) cooling the isocyanate-terminated prepolymer to 50 to 70° C. and neutralizing it for 20 to 30 minutes by adding tertiary amine; and d) dispersing the neutralized isocyanate-terminated prepolymer by adding water while stirring at a rate of 600 to 1000 rpm/min and chain extending it for 2 to 4 hours by adding a chain extender.

Hereinafter, the present invention is described in more detail.

The present invention provides a method of preparing water-dispersible poly (urethane-urea) having aliphatic-aromatic isocyanate, having improved mechanical/thermal properties, such as heat resistance, chemical resistance and adhesion, good cost competitiveness and environmental friendliness, by introducing an aromatic isocyanate compound, which has been limited to preparation of solvent type polyurethane due to its high reactivity with water, to prepare an isocyanate-terminated prepolymer, and neutralizing, dispersion, and chain extending the isocyanate based prepolymer.

The present invention utilizes the prepolymer mixing process, which is a well-known water-dispersing process for preparing water-dispersible polyurethane. This process prepares polymer dispersion by dispersing a prepolymer with low viscosity, which has low molecular weight and ionic groups, in water. This process requires less solvent.

The prepolymer mixing process will be described in more detail.

First, polyester polyol and dimethylol propionic acid are sufficiently stirred at 50 to 60° C. at 90 to 120 rpm/min. Then, after adding an aromatic isocyanate compound, a reaction is carried out for 20 to 40 minutes to prepare a hydroxyl (OH)-terminated prepolymer having carboxyl groups and urethane groups.

For the crystalline polyol, polyester polyol comprising at least 30% of crystalline polyol having a melting point of higher than 30° C., which has at least two hydroxyl groups, can be used. To be specific, the crystalline polyol is a compound having a molecular weight ranging from 500 to 4,000 and may be prepared from ethylene glycol and 1,4-butylene glycol. The hydroxyl (OH) number of the compound is about 75.

In the present invention, dimethyl propionic acid is used to introduce hydrophilic groups. Preferably, dimethyl propionic acid is used in 4.5 to 9.0 parts by weight for 100 parts by weight of polyester polyol. If its content is below 4.5 parts by weight, the dispersion becomes unstable. In contrast, if it exceeds 9.0 parts by weight, water resistance and adhesion of the dispersion deteriorate. For 100 parts by weight of dimethyl propionic acid, 120 to 200 parts by weight of N-methyl-2-pyrrolidone, methanol and ethanol are added to dissolve it prior to reaction.

For the aromatic isocyanate compound, the one having good physical properties and inexpensive, such as 4,4-methylene diphenyldiisocyanate (MDI), toluenediisocyanate (TDI), 1,5-naphthalenediisocyanate (NDI), tolidinediisocyanate (TODI) and p-phenyl diisocyanate (PPDI), may be used alone or in combination. Preferably, the aromatic isocyanate compound is used in 10 to 50 parts by weight for 100 parts by weight of the isocyanate compound. If its content is below 10 parts by weight, the thermal and mechanical advantages of aromatic isocyanate cannot be expected. In contrast, if it exceeds 50 parts by weight, the thermal and mechanical may worsen or there may arise such problems as coagulation and yellowing during the storage.

The most characteristic of the present invention is that an aromatic isocyanate compound is hybridized with an aliphatic isocyanate compound to improve dispersion stability, and thereby to prepare water-dispersible polyurethane having advantages of both isocyanates. The hydroxyl (OH)-terminated prepolymer having carboxyl groups and urethane groups is heated to 70 to 80° C., and excess aliphatic isocyanate compound is added to prepare an isocyanate (NCO) prepolymer having ionic dimethylol propionic acid groups in the middle and aliphatic isocyanate groups at both ends.

For the aliphatic isocyanate compound, isophoronediisocyanate, 1,6-hexamethylenediisocyanate or 4,4-dicyclomethanediisocyanate may be used alone or in combination.

Preferably, the ratio of NCO to OH groups in the prepolymer is 1.1 to 3.0. If the ratio is below 1.1, the dispersion stability may worsen or it is difficult to improve thermal and mechanical properties. In contrast, if it exceeds 3.0, the dispersion stability and storage stability may worsen.

Next, the isocyanate (NCO) prepolymer is cooled to 50 to 70° C. and neutralized for 20 to 30 minutes by adding a neutralizing agent. Then, water is added while stirring at 600 to 1000 rpm/min at room temperature to disperse the prepolymer. Then, chain extension is carried out for 2 to 4 hours by adding a chain extender.

For the neutralizing agent, tertiary amine such as dimethyl aminoethanol, N-methylmorpholine and triethylamine may be used alone or in combination. Preferably, the neutralizing agent is used in 80 to 120 equivalent % of the carboxyl group content of the isocyanate prepolymer. The content may be adjusted depending on purposes.

For the chain extender, diamine or diol may be used. To be specific, a compound having two primary or secondary amino groups or hydroxyl groups, such as ethylene diamine, butylene diamine, pentylene diamine, hexamethylene diamine, ethylene diol, propylene diol, butylene diol, pentylene diol and hexamethylene diol, may be used alone or in combination. The amount of the chain extender is determined by the ratio of NCO to OH groups in the prepolymer. Preferably, it is used in 30 to 100 equivalent % of the NCO group content of the NCO-terminated prepolymer.

Thus prepared water-dispersible poly (urethane-urea) with aromatic-aliphatic isocyanate has a solid content concentration of 25 to 50 wt %. It is used for 1 component system. It may have superior adhesion and coating properties to wood, fiber, plastic and rubber by high temperature curing. Also, it may have good adhesion and coating properties by low temperature curing.

Hereinafter, the present invention is described in more detail through Examples. However, the following Examples are only for the understanding of the present invention, and the present invention is not limited by the following Examples.

EXAMPLES

Example 1

120 g of crystalline polyester polyol comprising ethyleneglycol/1,4-butyleneglycol (molecular weight=1,500 g/mol, melting point=40 to 45° C.), having a hydroxyl number of 75, and 9 g of dimethylolpropionic acid were mixed in a solution dissolving 13.5 g of N-methyl-2-pyrrolidone for 20 minutes at room temperature. 22.1 g of 4,4-methylenediphenyldiisocyanate (MDI, molecular weight=250.26 g/mol) was added to the mixture solution and reaction was carried out for 30 minutes to prepare an OH-terminated polyurethane prepolymer.

19.6 g of isophoronediisocyanate (IPDI, molecular weight=222.29 g/mol) was added to the OH polyurethane prepolymer. Reaction was carried out for 40 minutes at 80° C. to prepare an NCO-terminated polyurethane prepolymer having carboxyl groups.

The NCO polyurethane prepolymer was cooled to 60° C., and neutralized by adding 6.8 g of trimethylamine while vigorously stirring. Then, water was added to disperse the neutralized prepolymer for 25 minutes until the solid content concentration reached 40%. 1.8 g of ethylenediamine dissolved in water was added to the dispersion to obtain water-dispersible poly (urethane-urea).

Example 2

Water-dispersible poly (urethane-urea) was obtained in the same manner as in Example 1 except for using 14.7 g of 4,4-methylenediphenyldiisocyanate and 26.2 g of isophoronediisocyanate.

Example 3

Water-dispersible poly (urethane-urea) was obtained in the same manner as in Example 1 except for using 7.4 g of 4,4-methylenediphenyldiisocyanate and 32.7 g of isophoronediisocyanate.

Example 4

Water-dispersible poly (urethane-urea) was obtained in the same manner as in Example 1 except for using 22.1 g of 4,4-methylenediphenyldiisocyanate and 17.0 g of isophoronediisocyanate.

Example 5

Water-dispersible poly (urethane-urea) was obtained in the same manner as in Example 1 except for using 22.1 g of 4,4-methylenediphenyldiisocyanate and 22.2 g of isophoronediisocyanate.

Example 6

Water-dispersible poly (urethane-urea) was obtained in the same manner as in Example 1 except for using 22.1 g of 4,4-methylenediphenyldiisocyanate and 24.9 g of isophoronediisocyanate.

Example 7

Water-dispersible poly (urethane-urea) was obtained in the same manner as in Example 1 except for replacing 4,4-methylenediphenyldiisocyanate with 15.3 g of toluenediisocyanate (TDI, molecular weight=174.2 g/mol).

Example 8

Water-dispersible poly (urethane-urea) was obtained in the same manner as in Example 1 except for replacing 4,4-methylenediphenyldiisocyanate with 18.5 g of 1,5-naphthalenediisocyanate (NDI, molecular weight=210.2 g/mol).

Example 9

Water-dispersible poly (urethane-urea) was obtained in the same manner as in Example 1 except for replacing isophoronediisocyanate (IPDI) with 14.8 g of 1,6-hexamethylenediisocyanate (HDI, molecular weight=168.2 g/mol).

Example 10

Water-dispersible poly (urethane-urea) was obtained in the same manner as in Example 1 except for replacing isophoronediisocyanate (IPDI) with 23.1 g of 4,4-dicyclomethanediisocyanate ($H_{12}MDI$, molecular weight=262.35 g/mol).

Example 11

Water-dispersible poly (urethane-urea) was obtained in the same manner as in Example 1 except for using 10.8 g of dimethylolpropionic acid and 8.15 g of trimethylamine.

Example 12

Water-dispersible poly (urethane-urea) was obtained in the same manner as in Example 1 except for using 7.2 g of dimethylolpropionic acid and 5.43 g of trimethylamine.

Comparative Example 1

Water-dispersible poly (urethane-urea) was obtained in the same manner as in Example 1 except for replacing aromatic isocyanate (MDI) with aliphatic isocyanate (IPDI) during the preparation of the OH-terminated polyurethane prepolymer.

Comparative Example 2

Water-dispersible poly (urethane-urea) was obtained in the same manner as in Example 1 except for using aromatic isocyanate (MDI) during the preparation of the NCO-terminated polyurethane (prepolymer).

Experimental Example 1

For the water-dispersible poly (urethane-urea) prepared in Examples 1 to 12 and Comparatives Example 1 and 2, particle size, viscosity, weight-average molecular weight, and NCO content were measured. The result is shown in Table 1 and FIGS. 1 and 2.

Testing Method

1) Particle size: Measured with a dynamic light scattering method (DLS, Brookhaven Instruments). All samples were dispersed in water at 25° C., and re-dispersed with a sonicator (Sonics & Materials) before measurement.

2) Molecular weight and molecular weight distribution: Measured by gel permeation chromatography (GPC, Waters). Dried samples were dissolved in tetrahydrofuran (THF) solvent to 0.5 wt %, and put in a μ-styragel series ($10^3$ and $10^4$ Å pore sizes-HR 3–HR 4) column at room temperature. Flow rate of the THF solvent was 0.7 mL/min, and the molecular weight standard curve was corrected with PS (polystyrene) standard for the retardation time. RI detector (Waters 410) was used. Weight-average molecular weights of standard PS samples were 1,270, 13,100, 196,000, 1,230,000 and 3,900,000.

3) Viscosity: Measured with the standard Brookfield viscometer (Brookfield Engineering Laboratories). Distilled water was used as blank sample. Temperature was maintained at 25° C. using a constant temperature bath. All samples were tested 2 to 3 times.

4) Detection of remaining NCO: Each sample was thinly applied on KBr. After fully drying, the urethane bonding was identified with FT-IR (Genesis Series, ATI Mattson).

TABLE 1

| Classification | Particle size (nm) | Viscosity (cP) | Weight-average molecular weight (g/mol) |
|---|---|---|---|
| Example 1 | 64.0 | 21.4 | 24,230 |
| Example 2 | 74.7 | 16.8 | 23,870 |
| Example 3 | 76.9 | 14.0 | 25,620 |
| Example 4 | 64.6 | 22.0 | 23,840 |
| Example 5 | 70.0 | 20.5 | 31,530 |
| Example 6 | 95.5 | 13.0 | 39,910 |
| Example 7 | 80.0 | 13.5 | 25,360 |
| Example 8 | 92.5 | 12.0 | 24,700 |
| Example 9 | 98.0 | 11.5 | 22,980 |
| Example 10 | 94.0 | 12.0 | 23,880 |
| Example 11 | 59.0 | 22.0 | 25,360 |
| Example 12 | 86.8 | 13.5 | 22,790 |
| Comparative Example 1 | 107.0 | 10.4 | 22,680 |
| Comparative Example 2 | N/A | N/A | N/A |

As seen in Table 1, water-dispersible poly (urethane-urea) prepared in Example 1 to 12 had particle size ranging from 54.6 to 98.0 nm, viscosity ranging from 11.5 to 22.0 cP, and weight-average molecular weight ranging from 22,840 to 39,910 g/mol. They had significantly improved physical properties compared with water-dispersible poly (urethane-urea) prepared in Comparative Examples. In Comparative Example 2, poly (urethane-urea) particles became unstable and gelated during dispersion due to the side reaction of polyurethane prepolymer and water.

FIG. 1 is the FT-IR analysis result showing the remaining NCO content at each step of Example 1. (a) is after mixing polyol and DMPA; (b) is just after adding aromatic isocyanate after mixing of polyol and DMPA; (c) is after preparing the OH-terminated polyurethane prepolymer; (d) is just after adding aliphatic isocyanate to the OH-terminated polyurethane prepolymer; and (e) is after ed aromatic-aliphatic hybrid isocyanate NCO-terminated polyurethane prepolymer (prior to chain extension). The urethane bonding could be identified from FIG. 1.

Figure 2:
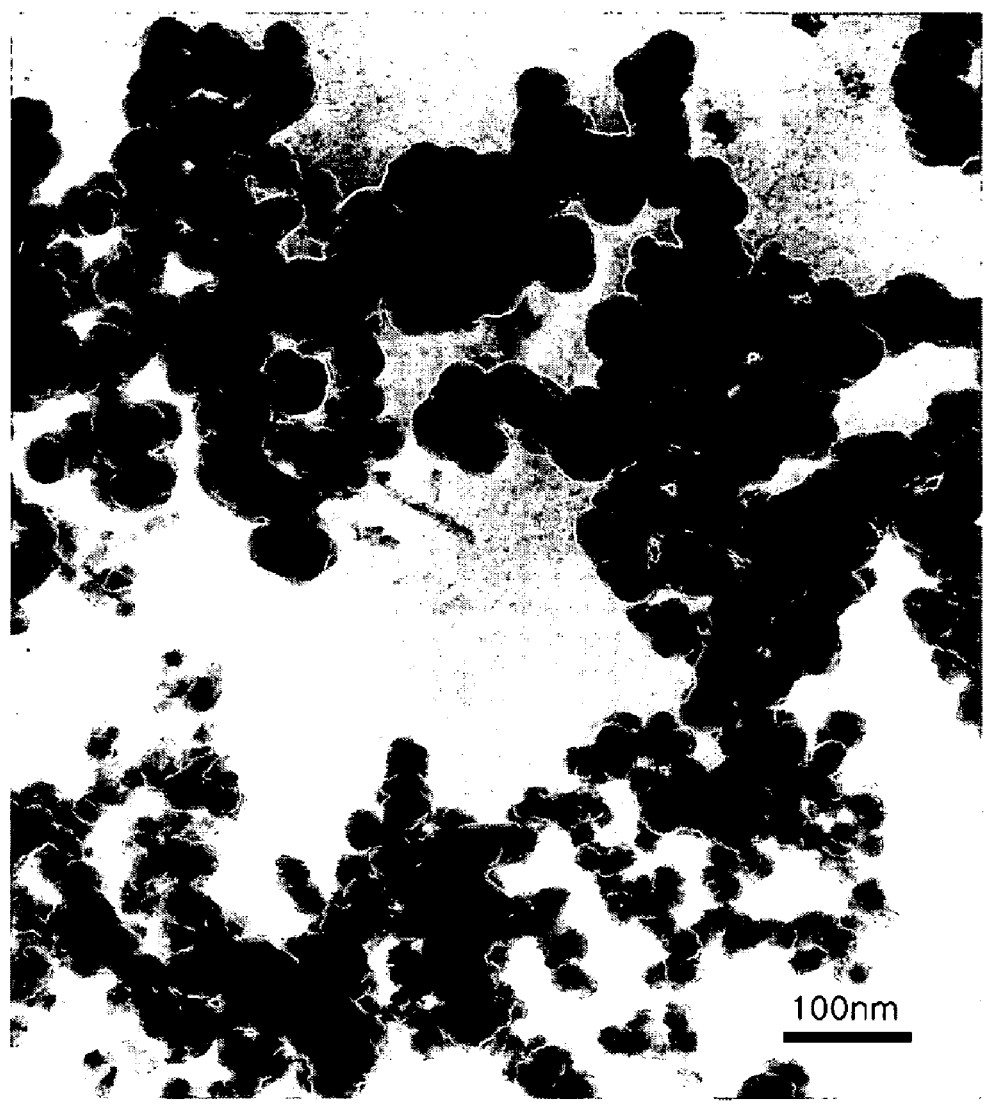
FIG. 2 is the TEM analysis result showing the water-dispersible poly (urethane-urea) particles prepared in Example 1 (bar size=100 nm).

FIG. 2 is the TEM analysis result showing the water-dispersible poly (urethane-urea) particles prepared in Example, which shows particle formation.

Figure 3:
FIG. 3 is the TEM analysis result showing the film prepared from the water-dispersible poly (urethane-urea) prepared in Example 1 (bar size=100 nm).

FIG. 3 is the TEM analysis result showing the film prepared from the water-dispersible poly (urethane-urea) prepared in Example 1, which shows film formation.

Experimental Example 2

Each water-dispersible poly (urethane-urea) prepared in Examples 1 to 12 and Comparative Example 1 was prepared into poly (urethane-urea) film. Tensile strength, 100% modulus, elongation, and glass transition temperature were measured. The result is shown in Table 2 below. Comparative Example 2 was excluded because film formation was impossible due to gelation.

Preparation of Poly (Urethane-Urea) Film

Each poly (urethane-urea) dispersion prepared in Examples 1 to 12 and Comparative Example 1 were applied on a flat surface and dried at room temperature to prepare poly (urethane-urea) film. Teflon was used to prevent film deformation and the film was kept in a desiccator to prevent exposure to moisture.

The poly (urethane-urea) film was analyzed with TEM. The result is shown in FIG. 3.

Testing Method

1) Mechanical properties (tensile strength, 100% modulus and elongation): Measured with a tension tester (UTM, Kinston). The poly (urethane-urea) film was kept in a 25° C. desiccator for 48 hours to prevent exposure to moisture. Each poly (urethane-urea) sample was cut into dumbbell shape with a thickness of 0.8±0.1 mm. Initial gap of the tension tester was set to 20 mm. Peel test was performed at a rate of 10 mm/min. 6 samples were tested for each poly (urethane-urea) film. Average value was obtained for three samples having larger tensile strength.

2) Thermal property (glass transition temperature): Measured with a differential scanning calorimeter (DSC, T.A. Instruments). Measurement was made in the temperature range from –80 to 150° C. Each dried sample was heated at a rate of 10° C./min under nitrogen purge (60 mL/min). Weight of the sample was 16 to 20 mg. Amorphous polymer material remains in glass state at low temperature and its volume increases slowly as temperature rises. However, the volume increases rapidly beyond some critical point. This temperature was defined as the glass transition temperature.

TABLE 2

| Classification | Tensile strength (kg$_f$/cm$^2$) | 100% modulus (kg$_f$/cm$^2$) | Elongation (%) | Glass transition temperature (° C.) |
|---|---|---|---|---|
| Example 1 | 30.28 | 12.13 | 639 | –41.3 |
| Example 2 | 29.06 | 11.93 | 646 | –42.3 |
| Example 3 | 28.14 | 11.52 | 654 | –44.0 |
| Example 4 | 27.43 | 11.52 | 661 | –41.1 |
| Example 5 | 32.94 | 12.85 | 618 | –41.4 |
| Example 6 | 35.08 | 13.46 | 597 | –41.0 |
| Example 7 | 29.90 | 11.98 | 627 | –41.2 |
| Example 8 | 31.24 | 11.88 | 620 | –40.9 |
| Example 9 | 30.86 | 12.04 | 636 | –41.4 |
| Example 10 | 30.22 | 13.02 | 640 | –41.7 |
| Example 11 | 32.43 | 12.85 | 594 | –38.9 |
| Example 12 | 29.06 | 11.62 | 689 | –41.6 |
| Comparative Example 1 | 25.25 | 10.56 | 578 | –41.0 |

As seen in Table 2, poly (urethane-urea) films prepared in Examples 1 to 12 had significantly improved properties (tensile strength, 100% modulus, elongation, and glass transition temperature) than that of Comparative Example 1. Therefore, the present invention greatly improves mechanical/thermal properties of poly (urethane-urea), including heat resistance, chemical resistance and adhesion.

As described above, aliphatic-aromatic isocyanate hybrid poly (urethane-urea) provided by the present invention has improved mechanical/thermal properties, including heat resistance, chemical resistance and adhesion, and superior environmental friendliness. Therefore, it will become a useful material for the industries, including daily goods, automobiles, electronics, civil engineering and shipbuilding.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A method of preparing water-dispersible poly (urethane-urea) having aliphatic-aromatic isocyanate comprising the steps of:

reacting polyester polyol comprising at least 30 wt % of crystalline polyol having a melting point of higher than 30° C. and dimethylol propionic acid (DMPA) at 50 to 60° C. at 90 to 120 rpm/min, and further reacting for 20 to 40 minutes after adding an aromatic isocyanate compound to prepare a hydroxyl (OH)-terminated prepolymer;

heating said the OH-terminated prepolymer to 70 to 80° C. and adding excess aliphatic isocyanate compound to prepare an isocyanate (NCO)-terminated prepolymer;

cooling said NCO-terminated prepolymer to 50 to 70° C. and neutralizing it for 20 to 30 minutes by adding tertiary amine; and water-dispersing said neutralized NCO-terminated prepolymer by adding water while stirring at a rate of 600 to 1000 rpm/mm and chain extending it for 2 to 4 hours by adding a chain extender.

2. The method of claim 1, further comprising the step of preparing said crystalline polyol from ethylene glycol and 1,4-butylene glycol, wherein said crystalline polypol has a weight-average molecular weight ranging from 500 to 4,000 grams per mole.

3. The method of claim 1, wherein said aromatic isocyanate compound is at least one compound selected from the group consisting of 4,4-methylene diphenyldiisocyanate (MDI), toluenediisocyanate (TDI), 1,5-naphthalenediisocyanate (NDI), tolidinediisocyanate (TODI) and p-phenyl diisocyanate (PPDI).

4. The method of claim 3, wherein said aromatic isocyanate compound is used in 10 to 50 parts by weight for 100 parts by weight of said isocyanate compound.

5. The method of claim 1, wherein said aliphatic isocyanate compound is at least one compound selected from the group consisting of isophoronediisocyanate, 1,6-hexamethylenediisocyanate and 4,4-dicyclomethanediisocyanate.

6. The method of claim 1, wherein the mole ratio of NCO to OH group ranges from 1.1 to 3.0.

7. The method of claim 1, wherein said tertiary amine is at least one compound selected from the group consisting of dimethyl aminoethanol, N-methylmorpholine and triethylamine and is used in 80 to 120 equivalent % of the carboxyl content of the isocyanate prepolymer.

8. The method of claim 1, wherein said chain extender is at least one compound selected from the group consisting of ethylene diamine, butylene diamine, pentylene diamine, hexamethylene diamine, ethylene diol, propylene diol, butylene diol, pentylene diol and hexamethylene diol.

9. The method of claim 1, wherein the amount of said chain extender is determined by the mole ratio of NCO to OH group.

* * * * *

UNITED STATES PATENT AND TRADEMARK OFFICE
CERTIFICATE OF CORRECTION

PATENT NO. : 7,193,011 B2  
APPLICATION NO. : 10/874327  
DATED : March 20, 2007  
INVENTOR(S) : Jung Hyun Kim, In Woo Cheong and Kyoung Min Ahn It is certified that error appears in the above-identified patent and that said Letters Patent is hereby corrected as shown below:

In Claim 2, Column 9, Line 20, change "polypol" to --polyol--.

In Claim 3, Column 9, Line 26 through Column 10, Line 1, change "1,5-naphthalenediisocy anate" to --1,5-naphthalenediisocyanate--.

Signed and Sealed this

Nineteenth Day of June, 2007

JON W. DUDAS  
*Director of the United States Patent and Trademark Office*